July 3, 1934.  T. B. MUNROE  1,965,351
LATH TRIMMING MACHINE
Filed July 10, 1929  11 Sheets-Sheet 3

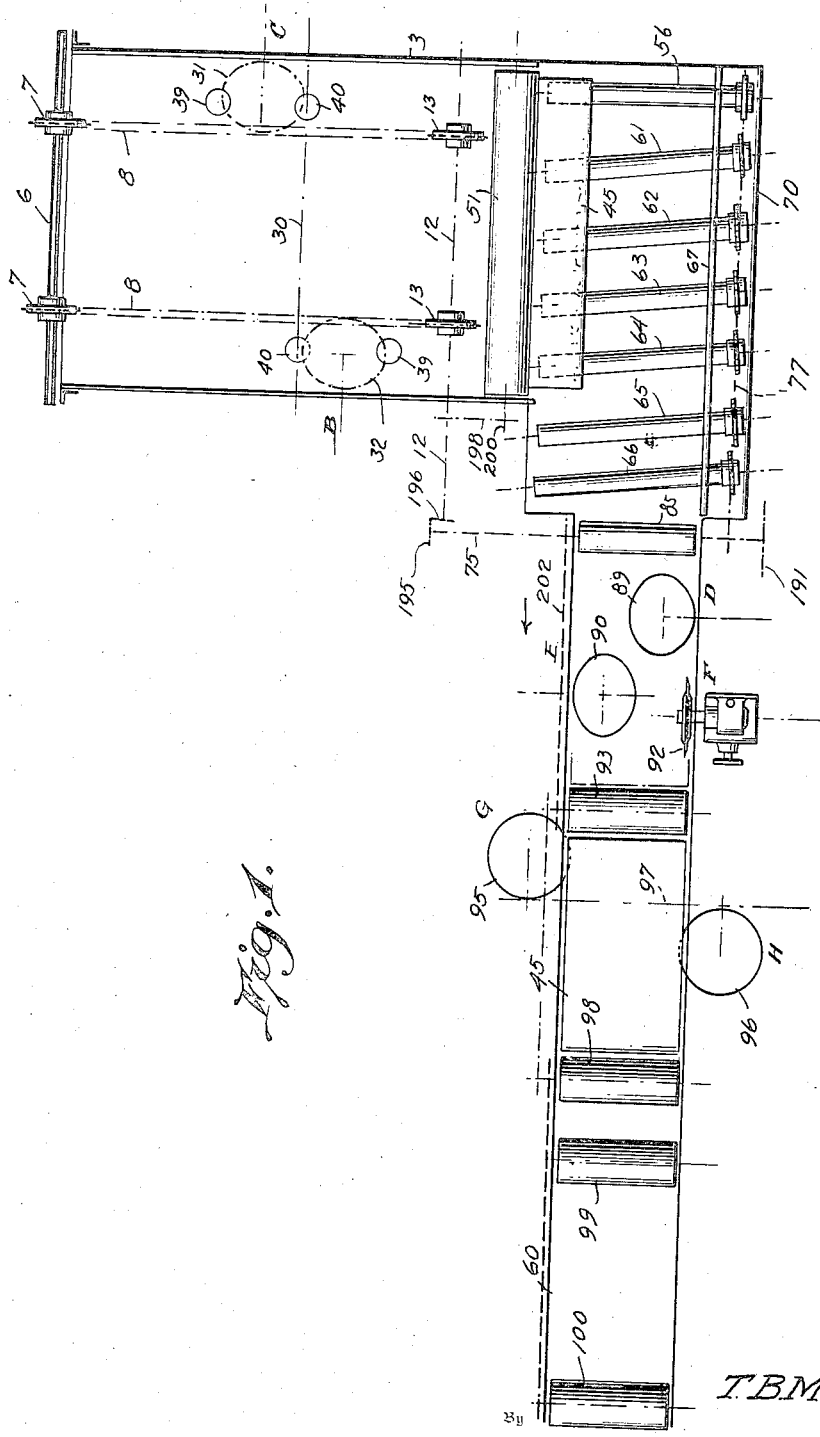

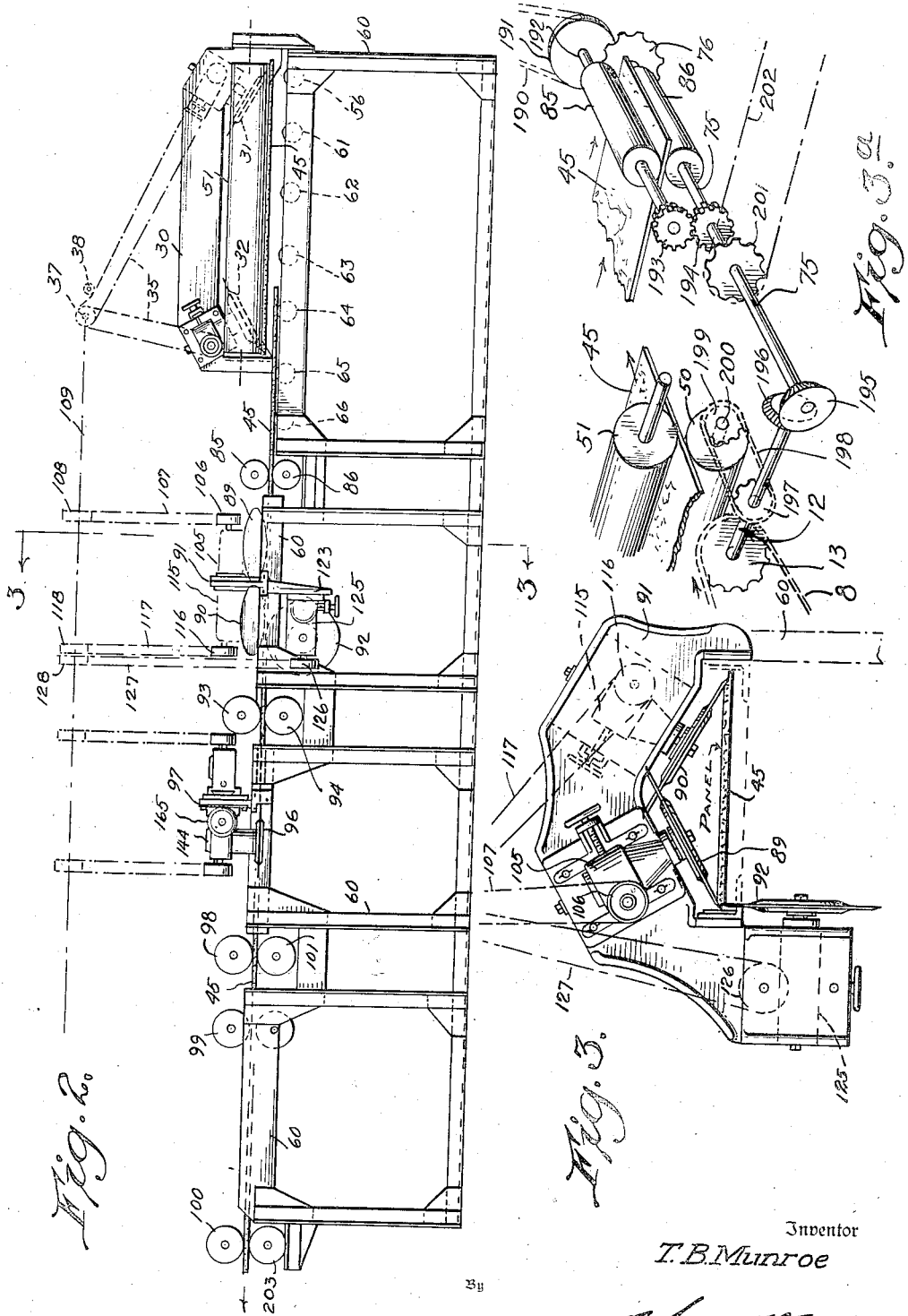

Inventor
T. B. Munroe
Attorney

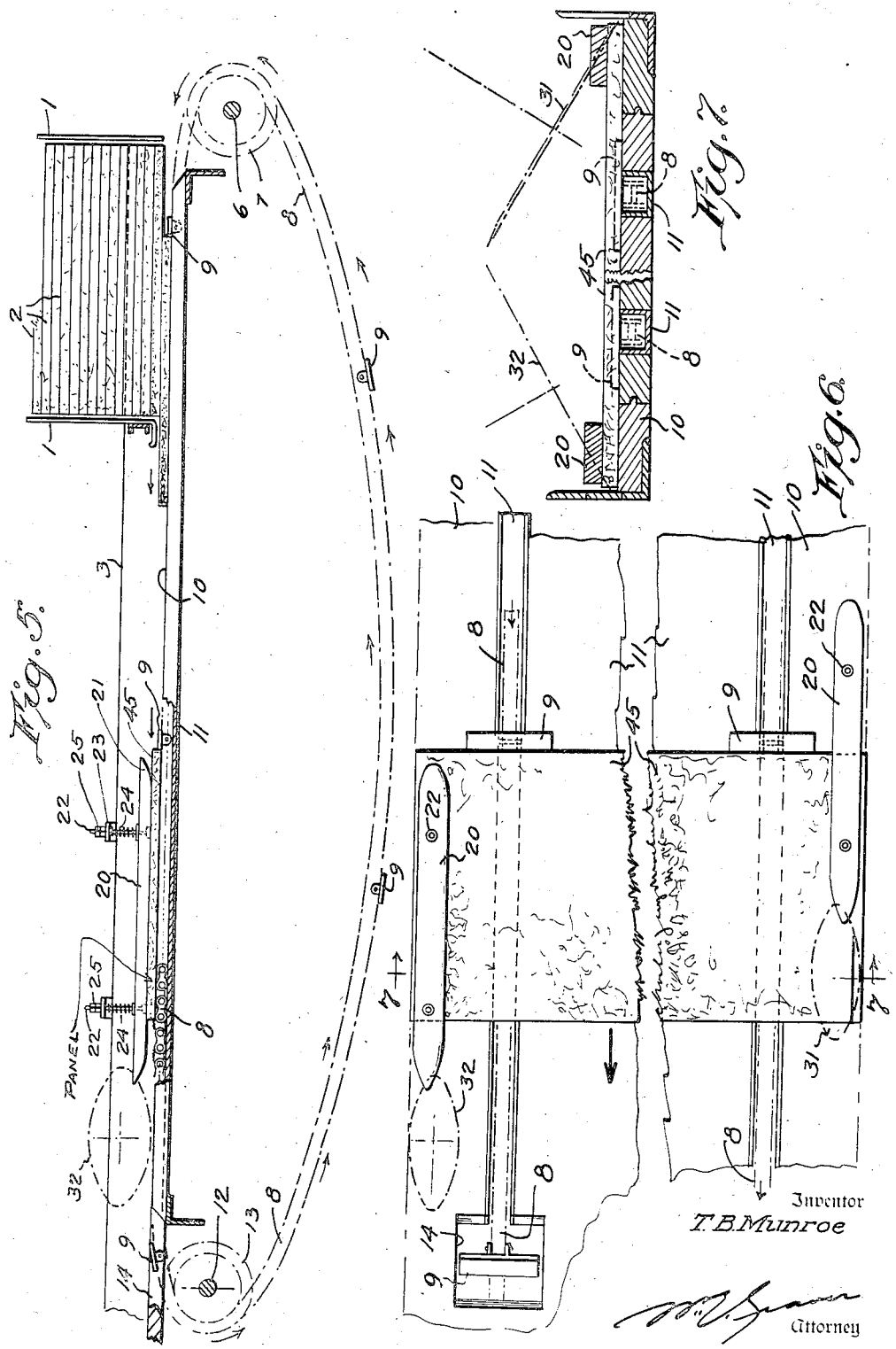

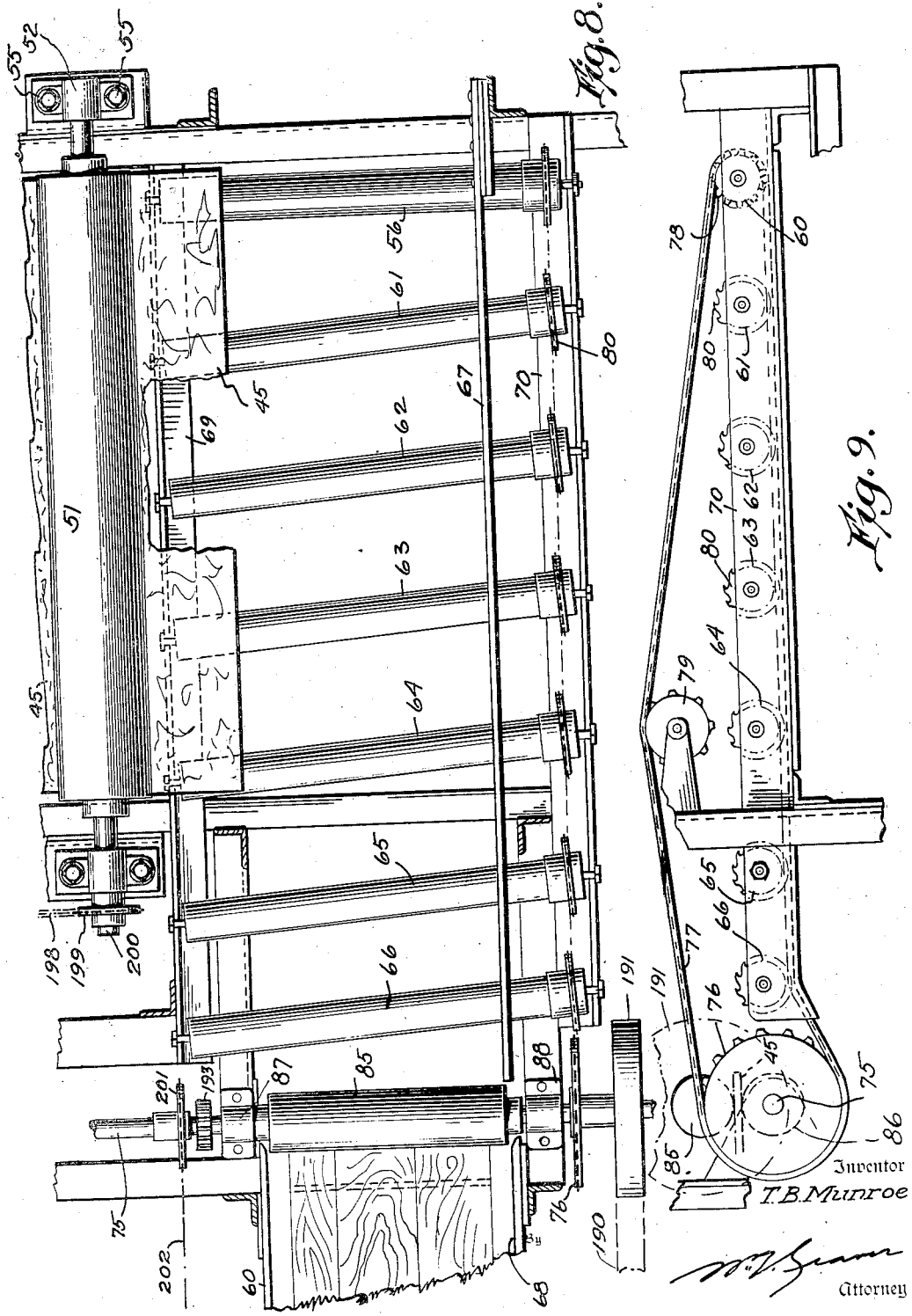

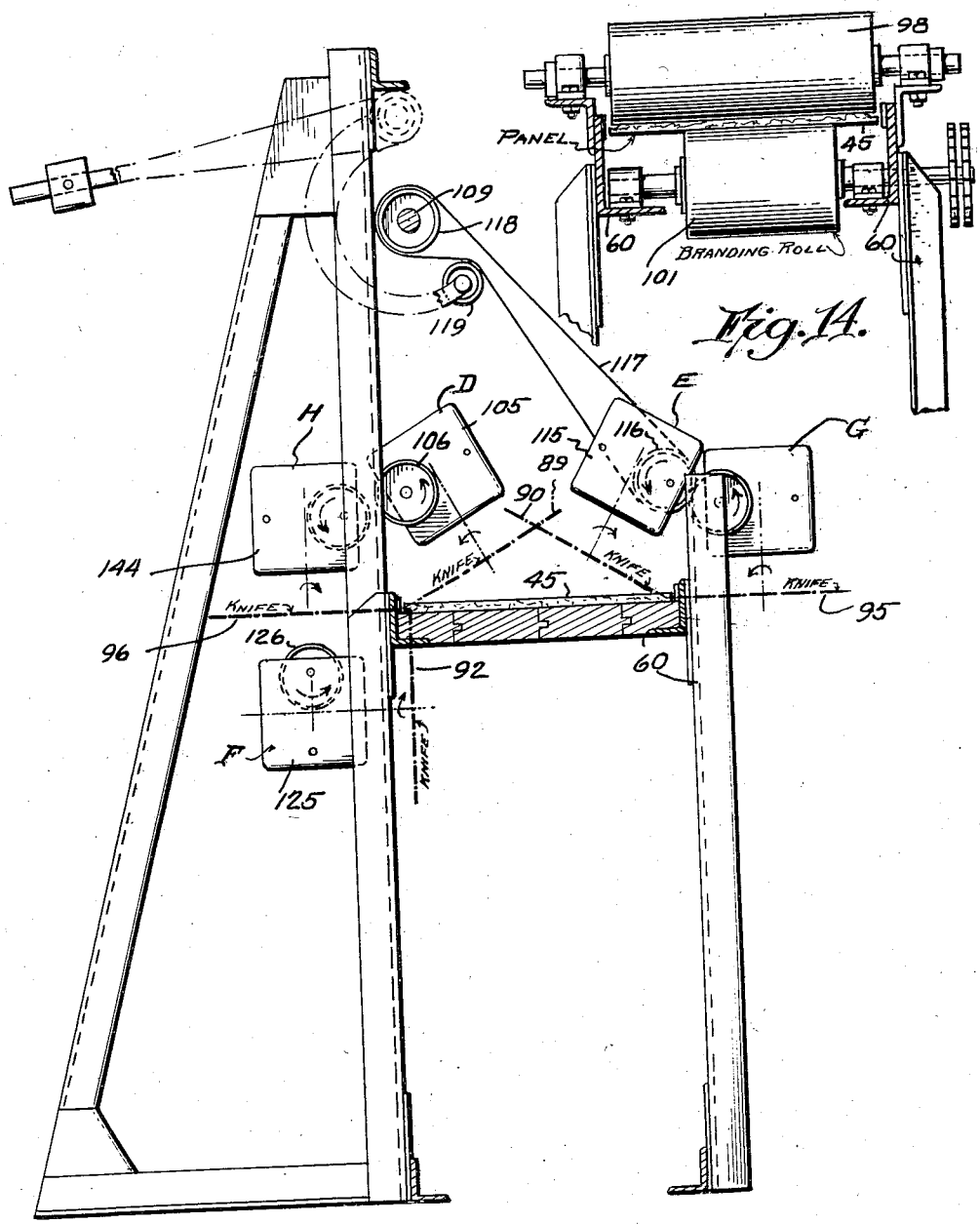

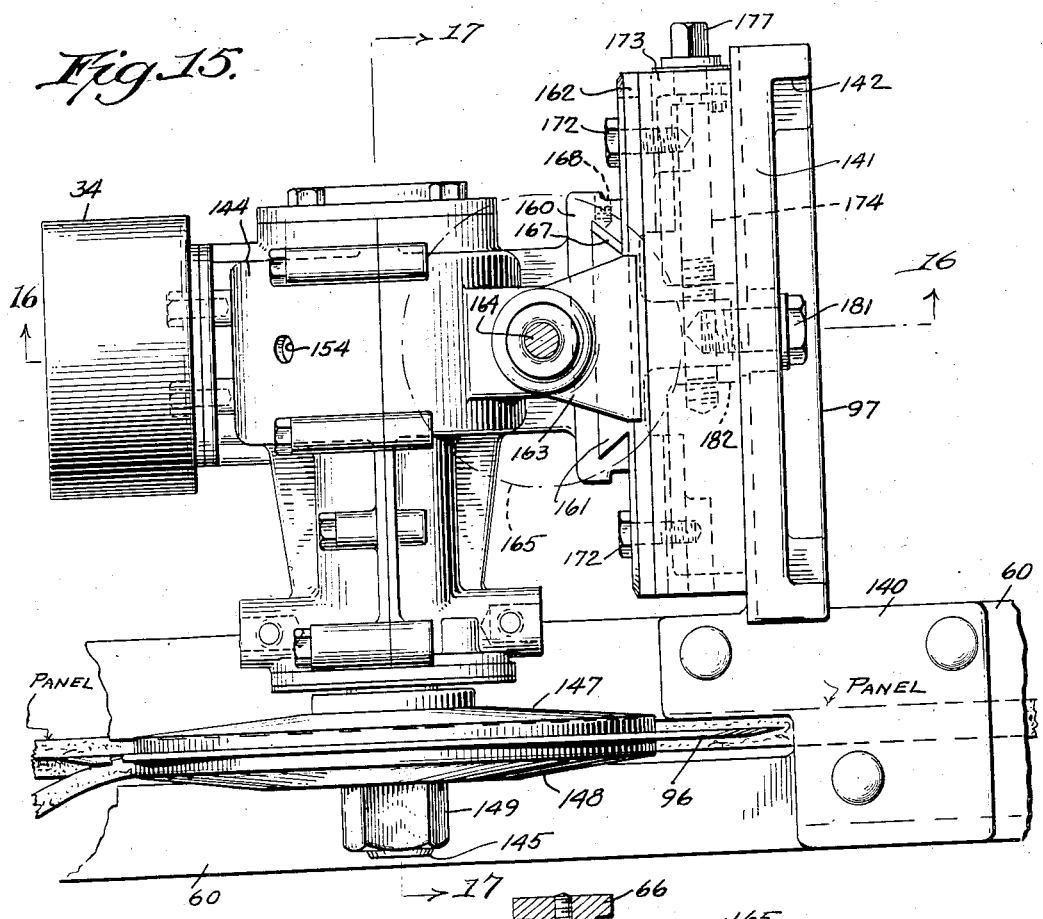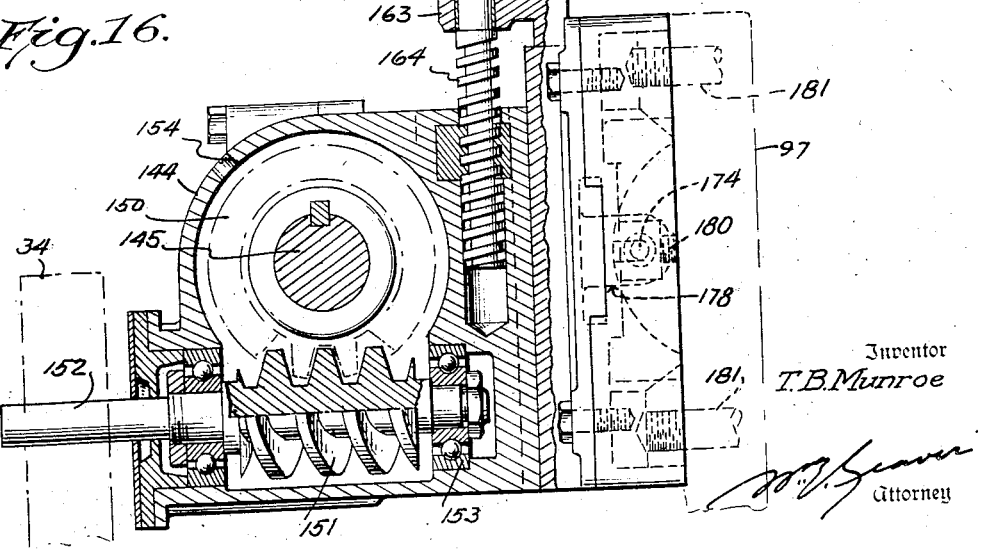

July 3, 1934.  T. B. MUNROE  1,965,351
LATH TRIMMING MACHINE
Filed July 10, 1929    11 Sheets-Sheet 9
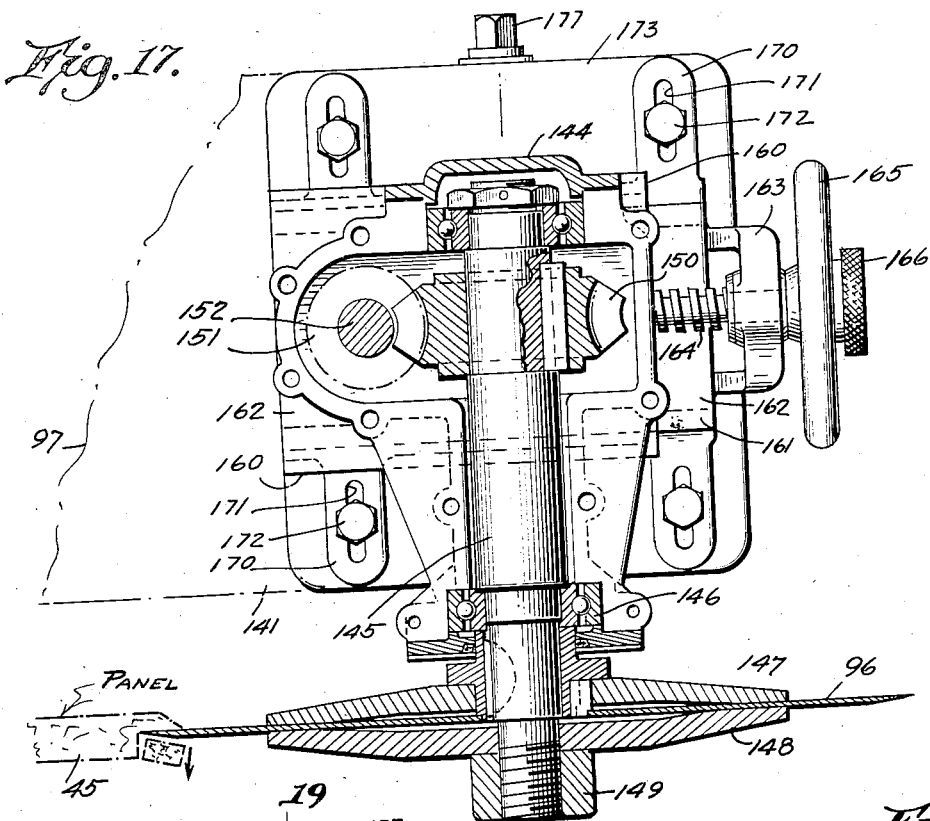
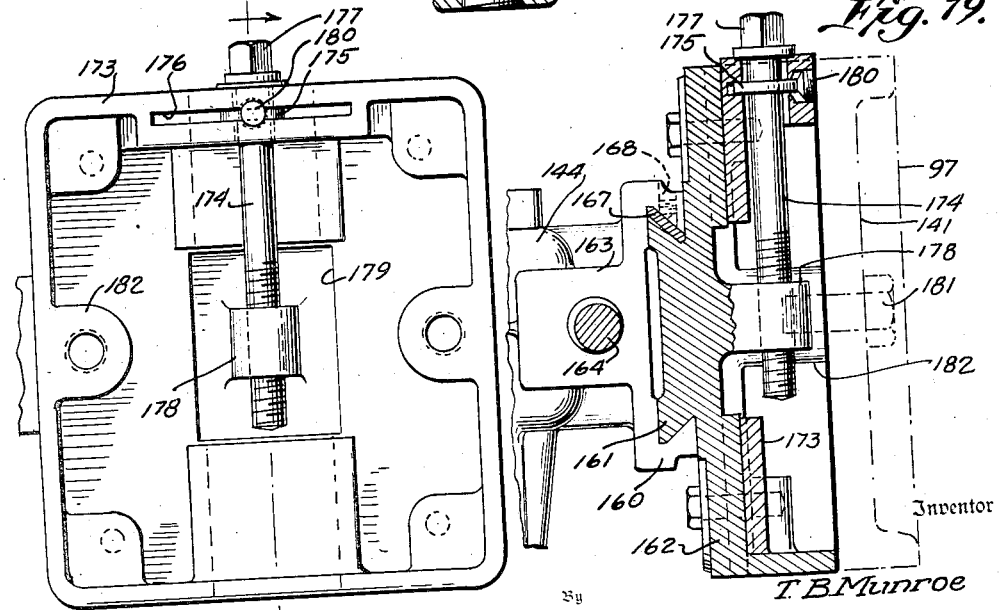
Inventor
T. B. Munroe
Attorney

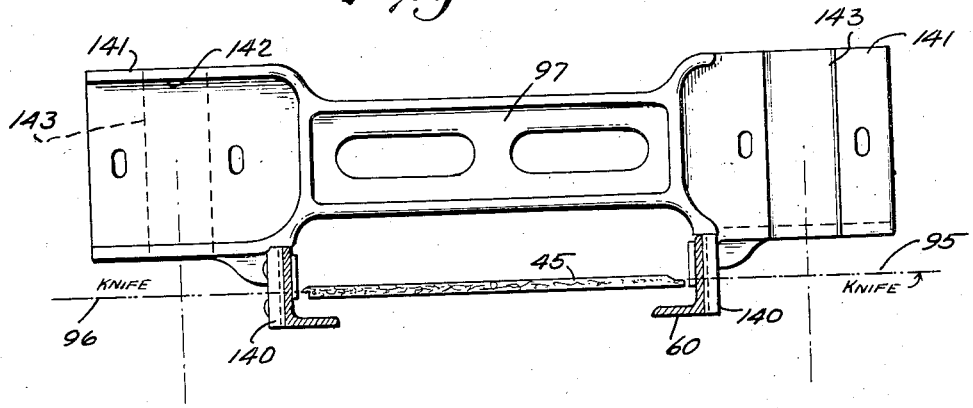
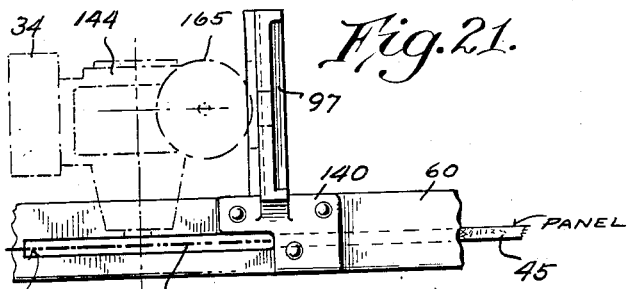
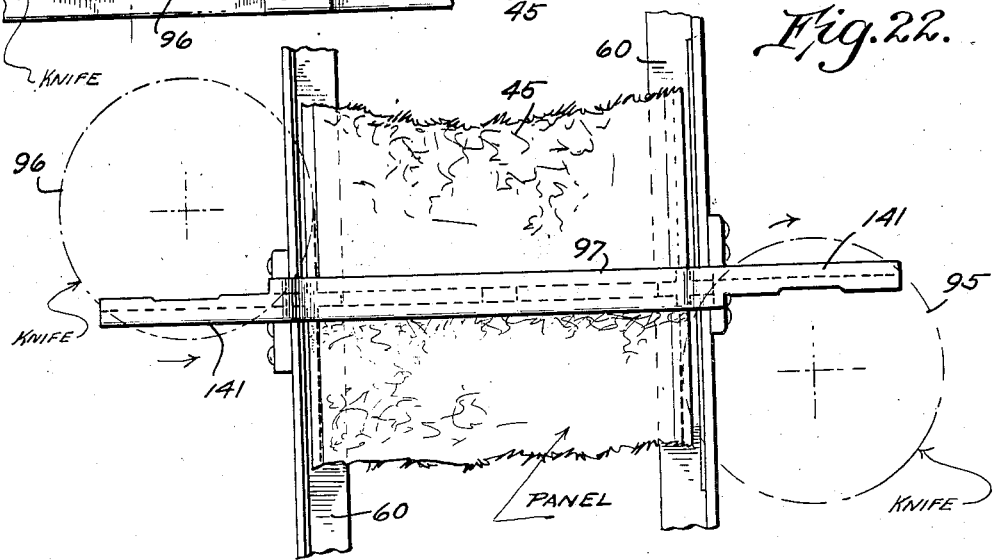

July 3, 1934.    T. B. MUNROE    1,965,351
LATH TRIMMING MACHINE
Filed July 10, 1929    11 Sheets-Sheet 11
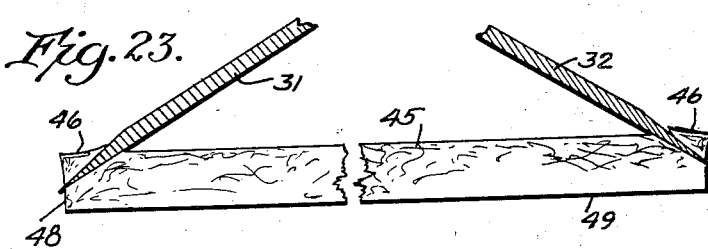
Fig. 23.
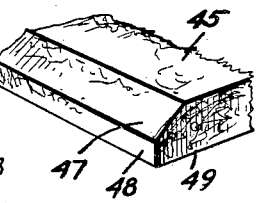
Fig. 24.
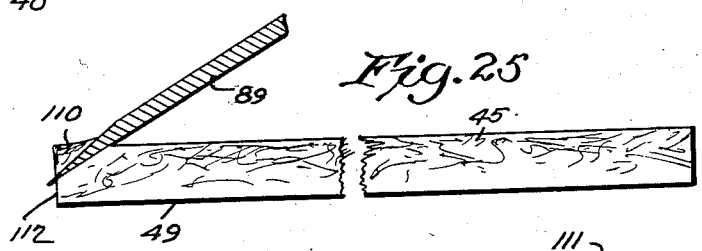
Fig. 25.
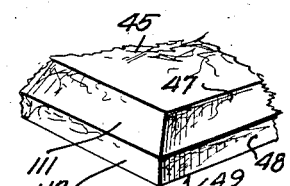
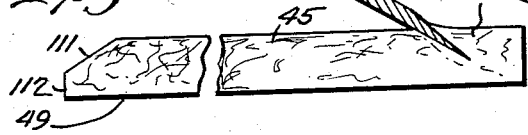
Fig. 27.
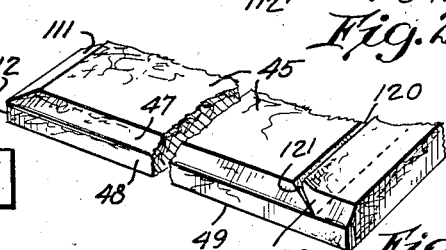
Fig. 26.
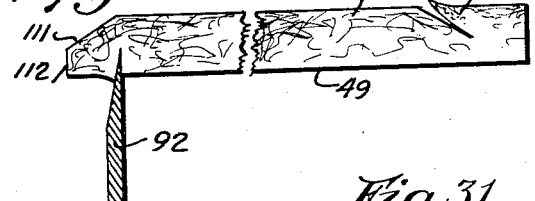
Fig. 29.
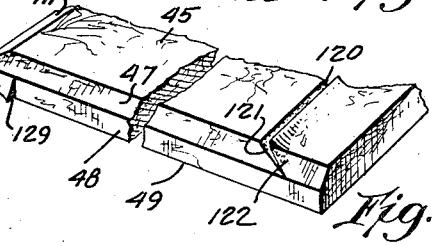
Fig. 28.
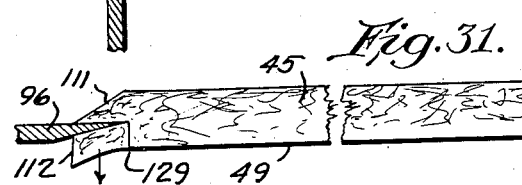
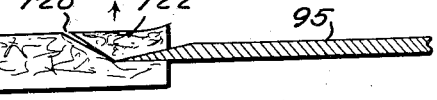
Fig. 30.
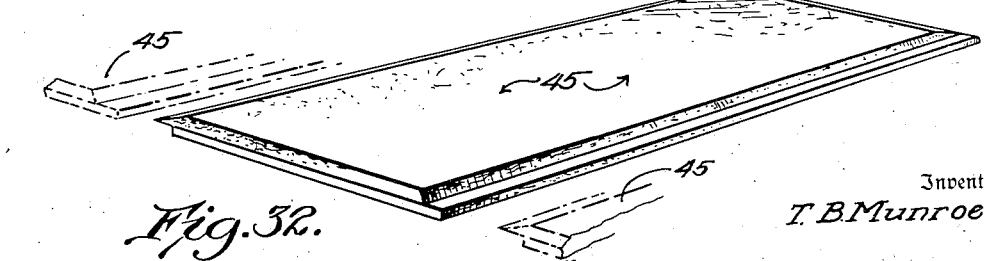
Fig. 31.
Fig. 32.
Inventor
T. B. Munroe
By
Attorney Patented July 3, 1934

1,965,351

UNITED STATES PATENT OFFICE 1,965,351

LATH TRIMMING MACHINE

Treadway B. Munroe, Chicago, Ill., assignor to The Celotex Company, Chicago, Ill., a corporation of Delaware Application July 10, 1929, Serial No. 377,192

13 Claims. (Cl. 164—61)

This invention relates to machines for trimming panels and more particularly to a machine for trimming the edges of building lath which is made in sheet formation, having for its object to provide a mechanism simple in operation and more efficient in use than those heretofore proposed.

With these and other objects in view the invention consists in the novel details of construction and combinations of parts more fully disclosed hereinafter and particularly pointed out in the claims.

Referring to the accompanying drawings forming a part of this specification in which like numerals designate like parts in all the views,—

Fig. 1 is a diagrammatic top plan view of a machine made in accordance with this invention;

Fig. 2 is a front elevational view of the parts shown in Fig. 1;

Fig. 3 is a detail taken as on the line 3—3 of Fig. 2 and looking in the direction of the arrows;

Fig. 3a is a perspective diagram of the power connections for the feeding means;

Fig. 5 is a diagrammatic side view partly in section further illustrating the feeding of the laths to the first cutters;

Fig. 6 is a top plan view somewhat diagrammatic of some of the parts illustrated in Fig. 5;

Fig. 7 is a transverse sectional view taken as on the line 7—7 of Fig. 6 and looking in the direction of the arrows;

Fig. 8 is a top plan view of the aligning mechanism by means of which a lath, having passed the first set of cutters, is properly positioned for delivery to the subsequent cutters;

Fig. 9 is a detail view of some of the parts shown in Fig. 8 and particularly illustrating the driving means for the rollers shown in said figure;

Fig. 13 is a transverse diagrammatic view illustrating the arrangement of the second set of cutters employed in this machine;

Fig. 14 is a transverse sectional detail view illustrating the disposition of the branding roll for marking each lath as it passes through the machine;

Fig. 15 is a general assembly in plan view of one of the cutters;

Fig. 16 is a sectional view taken as on the line 16—16 of Fig. 15 and looking in the direction of the arrows;

Fig. 17 is another sectional view of the cutter illustrated in Fig. 15, taken as on the line 17—17 thereof and looking in the direction of the arrows;

Fig. 18 is a bottom plan view illustrating one of the adjustments of the cutter shown in Fig. 15;

Fig. 19 is a sectional view taken as on the line 19—19 of Fig. 18 and looking in the direction of the arrows;

Fig. 20 is a detail view of the cross head for supporting the last set of cutters of this machine;

Fig. 21 is a diagrammatic detail view illustrating the mounting of one of the last pair of cutters to operate upon a lath;

Fig. 22 is a diagrammatic top plan view illustrating the relative positions of the last pair of cutters to operate upon a lath;

Figs. 23, 24, 25, 26, 27, 28, 29, 30 and 31 are detail views, illustrating the operations of the cutters and the results thereof upon a lath, said figures being in numerical sequence of the consecutive and separate operations upon a lath; and Fig. 32 is a perspective view of the completely trimmed lath.

Figure 4:
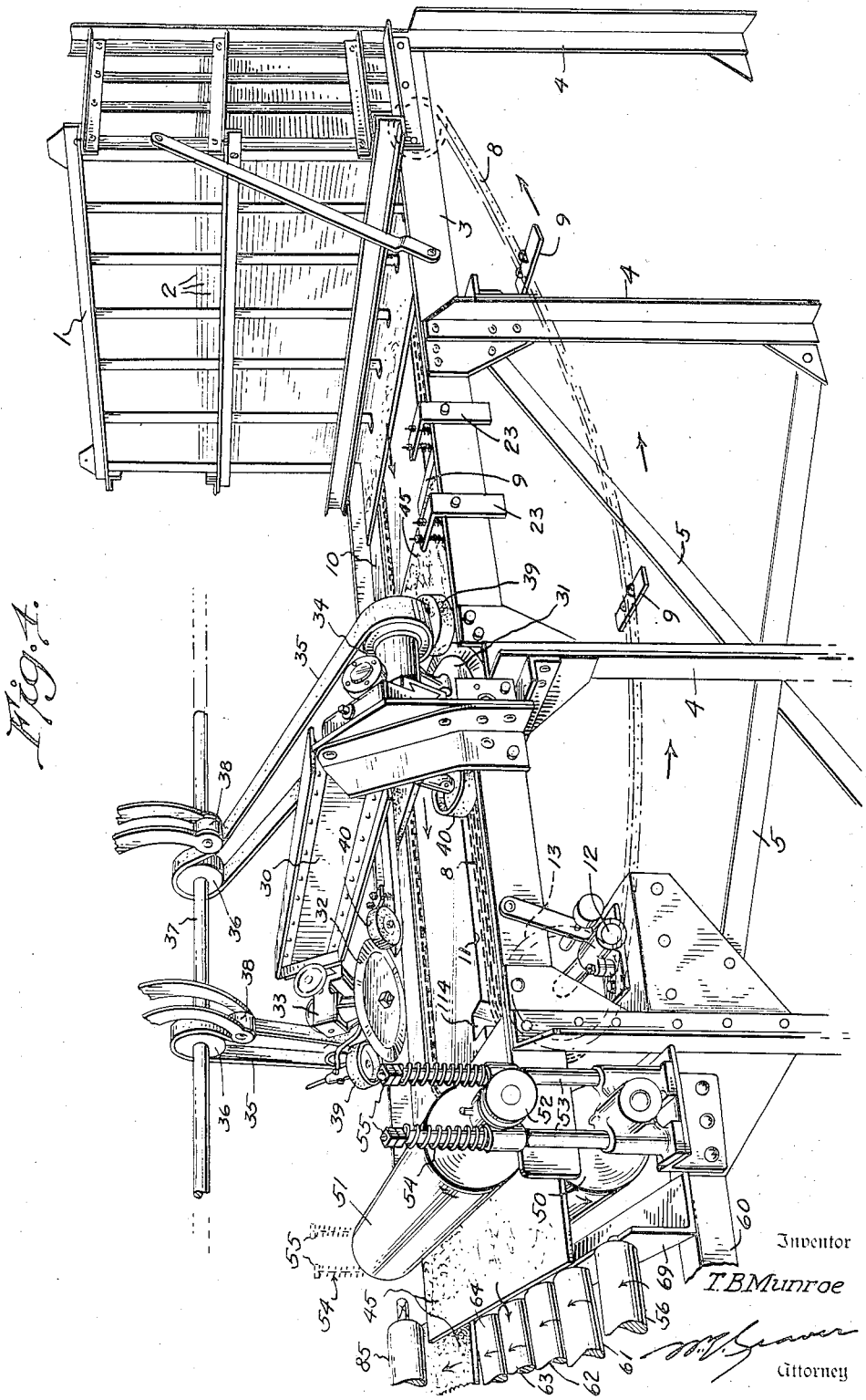
Fig. 4 is a perspective view of one portion of the machine to more clearly illustrate the feeding of the laths to the first trimming operation.

In order that this invention may be the better understood it is said that, in building operations, it has been customary heretofore to provide a wall structure between rooms which comprises vertical studding placed on sixteen-inch centers across which are nailed or otherwise secured either the usual narrow wooden strip laths or expanded metal lathing, and then over the lath is applied the mortar to which a decorative or smooth finish is applied in accordance with the desired effect in the room. Recently there has been placed on the market a wallboard which is made from fibers which have been pretreated through cooking, digestive and refining operations to produce, when felted, a homogeneous material in which, however, the individual fibers are heterogeneously arranged, the fibers due to their relative length and other characteristics, admirably entangled with each other to produce a strong and more or less rigid sheet material.

Such a wall board has innumerable interstices between the individual fibers so that it is peculiarly adapted to the absorption of heat and sound waves, to the end that said wallboard has been found of great value for insulating purposes. Also this wallboard has been applied either directly to the studding or to the laths thereon, the surface of the wallboard being well suited for the reception of a desired decorative finish. However, the wallboard as thus made in relatively large units such as 4 x 8 feet has had square or rectangularly formed edges so that when two units were adjacently secured to the partition framing there would result horizontal uncovered cracks or openings extending across the studding where the units met, the studding, of course, covering the vertical joints. This invention, therefore, is directed particularly to an adaptation of such a wallboard unit whereby the insulating features are retained but the defect just mentioned is overcome.

In other words the machine, forming the subject matter of this application, treats the edge portions of such a preformed wallboard whereby, when they are placed in position on the studding, no uncovered cracks or openings will result. An added feature of the invention lies in the fact that the units delivered to this machine have been precut to dimensions which are multiples of the spacing of the studdings.

That is to say, the units, boards, or panels are preferably preformed to have a 16 inch width and a 4 foot length, and these panels are fed by any suitable means into a magazine at one end of this machine, the bottom of said magazine being open whereby the lowermost panel in the stack may be slipped out by traveling conveyor chains and conducted to the first set of cutters B and C (see Fig. 1) which are so set that they will form chamfered edge portions extending half way through the panel on opposite edges thereof. After leaving this set of cutters the panel is conveyed to aligning rollers for correctly positioning the panel for sidewise travel to the second set of cutters D and E which produce, on the remaining opposite edge portions, a chamfered cut similar to the chamfer formed by the first set of cutters. With this second pair of cutters there is associated an auxiliary cutter F which operates upon the opposite surface of the panel, or upon the under side thereof, to provide a cut extending inwardly half way through the panel adjacent one longitudinal edge thereof.

The panel then travels between a third pair of cutters G and H in the mid plane of said panel and adapted to enter opposite edge portions of the panel to such a distance as to meet the limit of the cuts formed by the preceding cutters E and F, thereby to remove from the panel a one half edge portion. All of these cuts are particularly illustrated in Figs. 23 to 31 inclusive and will be readily understood with reference thereto. A branding roll is provided in conjunction with this machine imprinting on one surface of the panel any desired configuration, lettering, etc.

Referring to the drawings and particularly to Fig. 4 thereof the magazine, indicated by the numeral 1, comprises a framework of structural iron members within which the preformed boards or panels 2 are stacked. This magazine is rigidly secured at one end of a feeding table 3 likewise formed of structural iron members having the supporting legs 4 and braces 5. To one side of the magazine and in a plane therebeneath is disposed a shaft 6 upon which is mounted a pair of spaced sprockets 7 each engaged by a travelling chain 8 to which is secured, at spaced intervals, cleats 9 which, as they advance with the chain, will engage a longitudinal edge of the lowermost panel of the stack, slide it out from thereunder, and convey it to the first pair of cutters, see also Figs. 1, 5 and 6. For this operation the cleats 9 of one chain will be positioned exactly opposite a corresponding cleat on the other chain so that when the cleats pass over the sprockets 7 they will simultaneously strike the edge of the bottommost panel in the magazine and advance the same smoothly and evenly to the cutters.

The panel is thus slid over the bottom 10 of the table, closely confined between the upstanding sides thereof, the conveyor chains moving in channels 11 sunk in said bottom with the cleats of said chains as well as the panel moving in the same horizontal plane. A shaft 12 with spaced sprockets 13 thereon, which are duplicates of the shaft 6 and sprockets 7, are provided at the other end of the table 3 so that the first set of cutters are disposed between the shafts 6 and 12 the latter shaft being driven from any suitable source of power. The bed of the table is provided with suitable openings 14 through which the chains and cleats may pass, see Figs. 5 and 6. If found necessary the chains may be provided on one side thereof with projections such as teeth, clearly indicated in Fig. 5, to further aid in the conveying of the panels to the first pair of cutters.

In order to prevent the vertical displacement of a panel when it reaches the cutters, there is provided on each side of the table 3 a depresser bar 20 having appropriately curved ends 21 to insure the panel passing thereunder. Each bar 20 is provided with a plurality of upwardly extending rods 22 freely passing through angles 23 carried by the sides of the table, and each rod carries a compression spring 24 and nuts 25 by means of which tension is created between each depresser bar and the panel passing thereunder. Thus the panel is presented to the knives in tight engagement with the conveyor chains, and the depresser bars are of sufficient length to insure this contact.

The first pair of cutters is supported on opposite sides of the table 3 by a bridge 30 extending thereover, said bridge being formed of heavy structural iron members with the cutters mounted on opposite sides thereof in order that they may be driven independently. With particular reference to Fig. 4 it will be seen that the cutters are rotary disk knives, one 31 mounted on the side of the bridge next to the magazine 1 and the other 32 mounted on the opposite side thereof. Each knife is mounted upon a shaft contained in a housing such as 33, the housings for both cutters being identical and secured to the bridge 30 in such manner that adjustment of said knives is permitted. Each housing also carries a second shaft upon the end of which is secured a pulley such as 34 engaged by a belt such as 35 passing over a pulley such as 36 on a main power shaft 37, an idler such as 38 being provided to maintain driving tension on each belt. Also each housing has secured thereto a pair of sharpening members such as 39 and 40 adapted to lie on opposite sides of the plane of the disk cutter so that a sharp edge will always be maintained in said disk. The details of construction of the cutters as well as the housings therefor will be described hereinafter.

Referring now to Figs. 4, 5, 6, 23 and 24 it will thus be seen that a panel 45 will be abstracted from the bottom of the stack in the magazine and conveyed to the cutters 31 and 32, which will remove from the upper opposite corners thereof a portion 46, the cutters being arranged in obliquely inclined planes so that the panel, after passing said cutters, will be provided on its upper opposite short edges with a chamfer 47. The cutters are also positioned so that they will remove the portions 46 to a point substantially half way through the panel, thus leaving a surface 48 which is rectangularly disposed to the bottom surface 49 of the panel. In actual practice the chamfered surface 47 lies in a plane disposed substantially 45° with respect to the plane of the bottom 49 of the panel. At the end of the table 3 opposite the magazine 1 and just beyond the cutter 32 there is provided a pair of feed rollers 50 and 51, the former being mounted in more or less rigid bearings so that it revolves below, in tangential relation to, the moving panels, and the latter being mounted in bearings such as 52 which are adapted to slide on vertical guide rods such as 53 said bearings 52 being tensioned as by springs such as 54 disposed on the said rods and interposed between the bearings 52 and nuts 55 by means of which the tension on the springs 54 may be varied. It thus results that the roller 51 will yield when a panel passes between it and the lower roller 50, the yielding being permitted by the springs which are sufficiently strong to insure a proper feeding of the panel between said rollers. Either of the rollers 50 or 51 is adapted to be rotated by any suitable means, the speed of rotation being such that the panel will be moved smoothly and without jerking from the conveyer chains 8 to the rest of the machine. The rollers 50 and 51 will engage the advancing edge of the panel before the cutter 32 will have ceased its operation thereon, and therefore the travel of the panel is insured through this part of the machine.

The table as will be seen from Fig. 1 rectangularly joins a second table 60 upon which each panel is subjected to further cutting operations. On the table 60 at its juncture with the table 3 there is provided a plurality of rollers of equal diameter arranged in a horizontal plane disposed slightly below the plane of the table 3 (see Figs. 2 and 4), said rollers driven by a common chain, so that when the panel reaches said rollers it will move thereover by the rotation thereof, said rotation being in a direction to advance the panel along the table 60. These rollers are termed "aligning rollers" because they are peculiarly adapted to deliver the panel to the second group of cutters in precise position for correct operation thereupon by said cutters.

With particular reference to Figs. 1, 8, 9, 10, 11 and 12 the construction and operation of the aligning rollers should be apparent but it might be stated here that this group of rollers constitutes an end roller 56 located at the extreme end of the table 60 which is disposed at right angles to the length of said table, and incidentally at right angles to the feed rollers 50 and 51 above described. The remaining rollers 61, 62, 63, 64, 65 and 66 are all parallelly disposed with each other but each is canted, as shown in Fig. 8 so that a panel delivered thereto will have its edge moved forcibly into contact with a straight edge 67 which extends across the upper surfaces of the rollers, said straight edge being in true alignment with one upstanding edge 68 of the table 60. In other words, said table is provided with opposite upstanding edges which are spaced apart the exact width of the panel, in the same manner that the edges of the table 3 were spaced apart a distance exactly equal to the length of the panel, and therefore to insure each panel being delivered in true registry with the edges of the table 60, the straight edge 67 and the canted rollers above described are employed. Also, as will be clearly seen from Figs. 2 and 4 the aligning rollers are disposed below the plane of the table 3 so that the panel 45 being delivered from the feed rollers 50 and 51 will not interfere with the preceding panel being laterally conducted by the aligning rollers. The spacing of the cleats 9 on the conveying chains 8 is made just sufficiently greater than the width of a panel to allow time enough for a panel to be moved forward on the table 60 by the aligning rollers, which operate at a speed substantially three times that of the chain, before the following panel is dropped thereon by the rollers 50 and 51.

Figure 10:
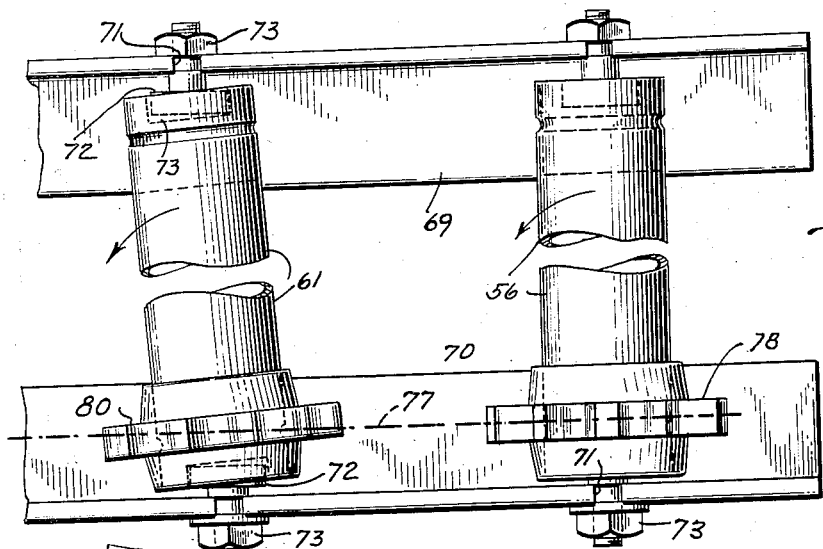
Fig. 10 is a foreshortened top elevational view of two of the rollers shown in Fig. 8 illustrating the mounting of the ends of a canted roller.
Figure 11:
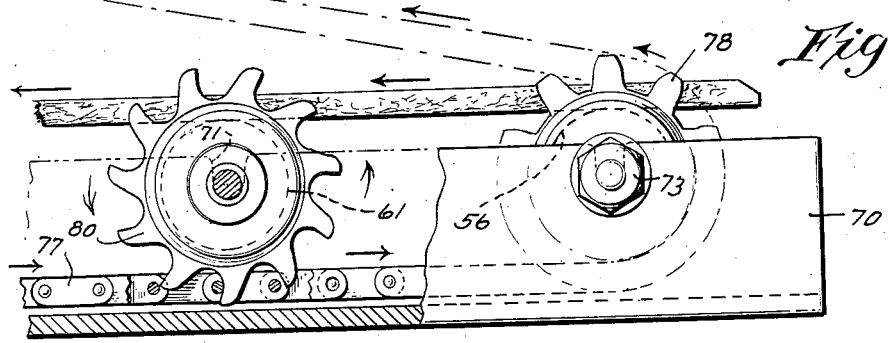
Fig. 11 is an enlarged detail view partly in section illustrating the formation of the sprockets used in connection with the drive of said rollers.
Figure 12:
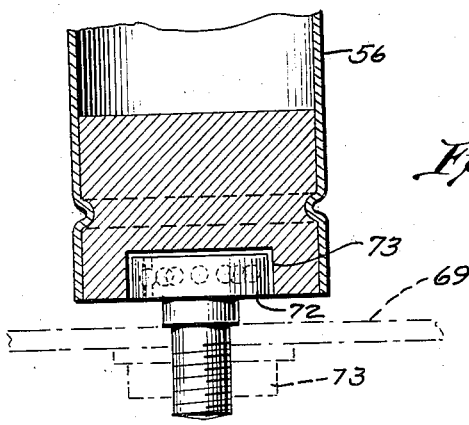
Fig. 12 is a partial sectional view illustrating a bearing support for one of the feed rollers used in this machine.

The bearings for the canted rollers are best understood with reference to Figs. 10, 11 and 12 wherein it will be seen that on opposite sides of the table 60 there are provided the structural iron angle members 69 and 70 in the edge of the upstanding flange of each of which there are provided at spaced intervals notches or slots such as 71 adapted to receive the stem of a bearing member having an enlarged head 72 which contains a ball race and which is adapted to fit within the pocket 73 formed in the end of each roller. This pocket is made slightly larger than the head 72 so that, as clearly shown in Fig. 10, play is provided when such a head is used with a canted roller. A nut 73 securely clamps each bearing member in position on the angle member 69 and 70. Due to the extremely light weight of the panel, it will readily be understood that the load which each roller has to carry is little more than its own weight and therefore such a bearing structure is sufficient. Further it is to be understood that the cant of each roller is very slight, being just enough to insure the travel of the panel thereover in tight engagement with the straight edge 67.

The means for driving all of the rollers is illustrated in Figs. 8 to 11 inclusive and comprises a shaft 75 receiving its rotational power from any suitable source. On the end of said shaft is mounted a large sprocket 76 engaging a chain 77 the lower run of which slides over and is supported by the horizontal flange of the angle member 70 said chain engaging, in its travel, the teeth of sprockets disposed on the ends of the aligning rollers. The chain passes around the sprocket 78 of the straight roller 56 and passes upwardly over an adjustable idler sprocket 79 disposed at a convenient point intermediate the said roller and the sprocket 76.

The sprocket 78 is of the usual and well known type but each of the sprockets such as 80 mounted on one end of the canted rollers is of peculiar construction. That is to say, each sprocket 80 has teeth which are outwardly and backwardly inclined with relation to the direction of rotation thereof, and the pitch of said teeth is slightly less than the pitch of the links of the engaged chain. The purpose of this construction is to insure the teeth of a canted roller sprocket entering the links of the chain and in this respect also the thickness of the sprocket 80 is slightly less than that of the width of the link openings in the chain.

The result of this peculiar construction is that engagement is insured at all times between each of said sprockets and the driving chain. In other words, a nut 73 may become loosened due to the vibration of the machine and something might happen to the bearing associated with said nut so that the supported canted roller would have a tendency to become bound, with the result that the constantly moving chain would force the sprocket and bound roller upwardly out of the slot 71 provided for the bearing of said roller. Stated in other words, when the rotational tendency of the roller was stopped this rotational movement would be translated into a vertical bodily movement of the roller, all as will be understood. The particular sprocket 80 utilized and above described overcomes this trouble by creating a tighter engagement with the links of the chain. Such a sprocket and its advantages as well as its function is completely described in a copending application filed June 21, 1926 by Treadway B. Munroe under the Serial No. 117,644 and entitled Sprocket patented June 2, 1931, No. 1,808,369 and therefore no further description is believed necessary here.

Adjacent the last canted roller 66 there is provided a vertical pair of feed rollers 85 and 86 the lower of which is mounted on the shaft 75 and the upper of which is carried in suitable bearings such as 87 and 88 secured to the side framing of the table 60. These feed rollers may be spring pressed and are adapted to engage the end of the panel delivered thereto from the aligning rollers above described. The panel is moved by these feed rollers to the second set of cutters 89 and 90 which are mounted on the opposite sides of the table 60 as well as on opposite sides of a cross head casting 91 rigidly secured to said table so that said cutters lie above the traveling panel. There is an auxiliary cutter 92 mounted on the same cross head casting but said cutter is disposed below the traveling panel. Just beyond the cutters 89, 90 and 91 there is disposed another pair of feed rollers 93 and 94 arranged vertically to pass the panel on to the last pair of cutters 95 and 96 which cutters are disposed on opposite sides of the table 60 and carried by a bridge-like casting or cross head 97 extending across the table.

Beyond the last pair of cutters just mentioned there are provided additional vertical pairs of feed rollers the upper rolls of which are indicated in Fig. 2 by the numerals 98, 99 and 100. One of the lower rollers of these last mentioned pairs, or the roller associated for example with the roller 98, constitutes a branding roll 101 upon the surface of which is disposed any configuration, lettering, or other device which is desired transferred to the under surface of the panels passing thereover. This branding roll may engage an inking device, or it may be heated by any suitable means so that the configuration, lettering, etc. is burned into the surface of the panel. In Fig. 14 the disposition of the branding roll is clearly illustrated with relation to the moving panel and the superposed feed roller 98.

Fig. 13 shows diagrammatically the table 60 with its associated cutter devices D, E, F, G and H, this figure being for the purpose of showing the relative positions of the knives of said devices to provide the desired cuts on the moving panel. In other words the device D comprises the rotary knife cutter 89 mounted upon the end of a shaft carried by the housing 105 which is adjustably secured to one side of the cross head 91, said cutter being disposed in a plane forming substantially an angle of 45° with the plane of the moving panel. The housing is provided with a second shaft upon which is mounted a pulley such as 106 engaged by a belt 107 passing over a pulley 108 mounted upon a power shaft 109 geared to the power shaft 37, see Figs. 2 and 3. The cutter 89, as will be seen from the drawings and particularly Figs. 25 and 26, is adapted to cut from the longitudinal edge of the panel 45 a portion 110 exactly similar to the portion 46 cut from the smaller edge of said panel by the cutter 31, thus forming a chamfered surface 111 symmetrical with the chamfered surface 47, and leaving a surface 112 extending from the chamfered surface 111 to the bottom 49 of the panel, said surface 112 being rectangularly disposed with respect to said bottom.

The cutting device E is a substantial duplicate of the cutting device D. In other words, it comprises the rotary knife cutter 90 mounted upon the end of a shaft carried by a housing 115 which is adjustably secured to the other side of the cross head 91, said cutter being disposed in a plane forming substantially an angle of 45° with the plane of the moving panel, and said housing having a second shaft extending therefrom upon which is secured a pulley 116 over which passes the belt 117 driven by a pulley 118 mounted upon the aforementioned power shaft 109. The two rotary knives 89 and 90 as will be seen from Figs. 3 and 13 are mounted on opposite sides of the table 60 and a weighted pivoted idler pulley such as 119 is provided for each of the belts 107 and 117. With particular reference to Figs. 27 and 28 it will thus be seen that the cutter 90 is adapted to form a cut in the upper surface of the moving panel but it does not sever from said panel any portion thereof. In other words, the cutter 90 merely enters the panel 45 to its substantial midplane and at a distance spaced from the edge of said panel thus forming an oblique cut 120 providing a chamfered surface 121, but leaving secured to the main body portion of the panel a portion 122 which will be subsequently severed therefrom.

The cross head 91 has a downwardly extending portion 123 upon which is adjustably secured the cutting device F which comprises a housing 125 from which extends one shaft, upon the end of which is mounted the rotary knife cutter 92, as well as a second shaft upon which is mounted a pulley 126 over which passes a belt 127 receiving power from a pulley 128 mounted upon said power shaft 109. This cutter is mounted in a vertical plane parallel to an edge of the moving panel, and is positioned to form a cut extending inwardly to the midplane of the panel 45 but which is spaced from the edge thereof, see Figs. 29 and 30. In other words, the cutter 92 enters the panel and makes the cut 129 which is vertical to the bottom 49 of the panel and substantially in the plane of the line of intersection between the top surface of the panel and the chamfered surface 111.

It is not believed necessary to describe in detail the cutting devices G and H since they are substantial duplicates of the cutting devices previously mentioned. However, it might be particularly brought out that they comprise similarly powered and driven cutters 95 and 96 which are disposed in horizontal mid-plane of the traveling panel and on opposite sides of the table 60, said cutters being likewise supported on opposite sides of the cross head 97. With particular reference to Fig. 31 it will be readily seen that the purpose of these two cutters is to remove from the panel 45 the above mentioned portion 122 and the portion of the panel adjacent the cut 129. In other words, the cutters 95 and 96 form incisions, in the edge portions of the panel and in the mid plane thereof, which meet the extremities of the cuts 120 and 129 and produce flat surfaces parallel to the upper and lower surfaces of the panel, which particularly adapts adjacent panels for lapping engagement as indicated in Fig. 32.

The mounting for each cutter is substantially the same and in Figures 15 to 19 inclusive are illustrated details thereof, the particular cutter illustrated being the cutter 96 mounted for making the horizontal cut shown at the left hand end of Fig. 31. The main support is the bridge 97 shown in Fig. 20 which extends across the table 60 and is secured thereto on each side by a depending flange 140. Beyond each flange, or extending away from the table 60, is a wing generally indicated by the numeral 141 which is provided on one side and on its edge portion with a reinforcing rib 142 for strengthening purposes, leaving the other side of the wing substantially planar except for a central vertically disposed journal 143 within which is mounted a stem carrying an abrasive wheel such as indicated by the numeral 39 in Fig. 4. In other words, each of the cutters of this machine is provided with a pair of abrasive wheels which are so mounted as to sharpen the opposite edge surfaces of the cutter.

The cutter mounting comprises a housing including a casting 144 adapted to receive a shaft 145 mounted in suitable roller bearings such as 146 and on the end of said shaft is secured the disk cutter 96 between two clamping plates 147 and 148, the whole secured by a nut 149 threaded on the end of said shaft. Within the casting and secured to the shaft 145 is a gear 150 meshing with a worm 151 formed on a stub shaft 152 likewise mounted in roller bearings such as 153, the end of said stub shaft extending out of the casting to receive a pulley such as indicated at 34 in Fig. 4, said pulley receiving power from a suitable source as above described.

The shaft 145 is mounted at right angles to the stub shaft 152, the casting being provided with a suitable opening such as 154 through which grease or other lubricant may be admitted to the worm gear drive and bearings.

The casting 144 has a flange extension 160 in which is formed a dove-tail groove adapted to slidingly engage a correspondingly shaped track 161 formed on an adjusting plate 162 provided with an overhanging portion 163 through which passes a screw 164 which is threaded into a portion of the casting 144. The outer end of this screw carries a hand wheel 165 and a lock nut 166 which, as clearly seen from Fig. 16, furnishes a means of moving the casting 144 on the track 161. A friction clamp comprising a strip 167 of metal is interposed between said track and the dove-tail groove, a set screw 168 carried by said casting being employed for creating sufficient friction between said strip and said track to secure the casting to the plate 162 after the casting has been adjusted to the correct position for forming the desired cut by the knife 96, see particularly Fig. 19. From the foregoing and with particular reference to Figs. 15 and 17 it will thus be seen that by turning the hand wheel 165 the cutter 96 may be moved to make a shallow or a deep cut in the side of the moving panel 45.

The adjusting plate 162 is preferably formed with four extending ears 170 each provided with an elongated slot 171 adapted to receive therethrough bolts 172 said bolts being for the purpose of securing the plate 162 in adjusted position to a base plate 173 substantially rigidly attached to a wing 141 of the bridge 97. In other words, the elongated slots 171 are parallelly disposed to each other as clearly seen in Fig. 17 and permit the casting 144 to be moved bodily in a direction at right angles to the direction of movement of said casting caused by screw 164, so that said casting is adapted for movement in two planes disposed at right angles to each other, as a result of which the disk cutter may be moved not only to create a shallow or a deep cut in the panel, but a cut which may be disposed in the midplane of said panel or in a plane closer to the top or closer to the bottom surface thereof. When the casting has been moved to its desired position then the bolts 172 are tightened to prevent further movement thereof.

The means for accomplishing this last mentioned adjusting movement of the casting comprises a screw 174 prevented from longitudinal movement by a pin, or collar such as indicated at 175, said collar being disposed in a limiting slot 176 formed in the base plate 173, said screw having on its outer end a squared portion 177 adapted to receive a turning wrench. The inner end of the screw extends to a point beyond the center of the plate 173 and is threaded into a lug 178 formed on the face of the adjusting plate 162, said lug extending through an opening 179 in the center of the base plate, see Fig. 18. By loosening the bolts 172 and turning the screw 174 the casting 144 together with the adjusting plate 162 is moved and, when the correct position of the casting with its associated cutter is obtained, then the bolts 172 are tightened. As a further securement against undesired movement of the above mentioned parts a set screw 180 is provided which engages the periphery of the aforementioned collar 175, said set screw being threaded through a portion of the base plate 173. The base plate is firmly secured at all times to the wing of the bridge by bolts 181 engaging lugs 182 on said plate.

A convenient power-transmission for the panel feed means is illustrated in Fig. 3a. A belt 190 engaging a suitable source of power, such as a pulley on an electric motor, drives the pulley 191 mounted on one end of the shaft 192 carrying the feed roller 85. On the other end of said shaft is mounted a spur gear 193 meshing with a companion gear 194 mounted on the shaft 75 of the roller 86. The shaft 75 is extended beyond the gear 194 and has at its end a bevel gear 195 meshing with a companion bevel gear 196 mounted on the end of the shaft 12 carrying the sprockets 13 for driving the conveyor chains 8 associated with the table 3. The shaft 12 carries a sprocket 197 engaging the chain 198 for driving the sprocket 199 mounted on the shaft 200 of the roller 50. The upper roller 51 is driven either through contact with the roller 50 or through contact with the moving panel 45 passing between said rollers.

Between the gears 194 and 195 on the shaft 75 is mounted a sprocket 201 and on the end of said shaft beyond the roller 86 is mounted the sprocket 76 which latter drives the hereinbefore described aligning rollers. The sprocket 201 drives a chain 202 engaging a sprocket mounted on the shaft of roller 94 which shaft has a second sprocket connected by a driving chain with a sprocket on the shaft of roller 101. This last mentioned shaft also has a second sprocket connected by a driving chain with a sprocket on the shaft of the roller 203 associated with roller 100, see Fig. 2. Thus it will be seen that the pulley 191 transmits power to the shafts of rollers 85 and 86 the shaft of the latter transmitting power to the aligning rollers as well as the conveyor chains 8 and the pair of heavy feed rollers 50 and 51.

Also the shaft of roller 86 drives the shaft of roller 94 which latter drives the shaft of roller 101 which in turn drives the shaft of roller 203. One of the intergeared overhead power shafts 37 and 109 may be driven from the same source of power used to drive the pulley 191, hence it will be seen that an economical power consumption and transmission is effected.

It is obvious that those skilled in the art may vary the details of construction as well as arrangements of parts without departing from the spirit of the invention and therefore it is not desired to be limited to the foregoing except as may be required by the claims.

What is claimed is:—

1. In a machine of the character described the combination of a set of cutters for operating upon the end edges of a blank; a second set of cutters for operating upon the side edges of said blank; means for feeding said blank to said cutters; and roller means for changing the direction of feed of said blank between the sets of cutters the axes of the rollers of said roller means slightly canted, in a horizontal plane, relative to the direction of operation of the feed means associated with the first set of cutters.

2. In a machine of the character described the combination of a set of cutters for operating upon the end edges of a blank; a second set of cutters positioned to one side of the first cutters for operating upon the side edges of said blank; means for feeding said blank to said cutters; and means comprising rollers set obliquely to the travel of said blank for changing the direction of feed of said blank between the sets of cutters.

3. In a machine of the character described the combination of a set of cutters for operating upon the end edges of a blank; a second set of cutters positioned to one side of the first cutters for operating upon the side edges of said blank; means for feeding said blank to said cutters; and means comprising rollers set obliquely to the travel of said blank as well as a straight edge for guiding said blank for changing the direction of feed of said blank between the sets of cutters.

4. In a machine of the character described the combination of a set of cutters for operating upon the opposite end edges of a blank; means to feed said blank to said cutters; a second set of cutters disposed in a plane below the plane of said first set and to one side thereof, said second set for operating upon the opposite side edges of said blank; and self-acting means to feed said blank from said first to said second set of cutters, said means disposed below the plane of said first feeding means and obliquely to the line of travel thereof.

5. In a machine for trimming the edges of a rectangular blank the combination of supporting tables rectangularly disposed to each other; cutters arranged on each table; blank feeding means associated with the cutters of one of said tables, said means including coacting holding means having sliding engagement with said blank whereby positive connection between the latter and said feeding means is maintained; positive rotary blank feeding means associated with the cutters of the other of said tables, an aligning member disposed at the juncture of said tables and associated therewith means for simultaneous presentation of a blank to the aligning member and for feed initiating movement of the blank to the positive rotary feeding means and its associated cutter.

6. In a machine for trimming the edges of a rectangular blank the combination of supporting tables rectangularly disposed to each other; cutters arranged on each table; blank feeding means associated with the cutters of one of said tables, said means including coacting holding means having sliding engagement with said blank whereby positive connection between the latter and said feeding means is maintained; positive rotary blank feeding means associated with the cutters of the other of said tables; and aligning means coacting with said last named means and associated cutters to accurately present the blank thereto, said aligning means including a straight edge and offset rollers.

7. In a machine for trimming the edges of a rectangular blank the combination of supporting tables rectangularly disposed to each other; cutters arranged on each table; blank feeding means associated with the cutters on one of said tables, said means including coacting holding means having sliding engagement with said blank whereby positive connection between the latter and said feeding means is maintained; positive rotary blank feeding means associated with the cutters of the other of said tables; and aligning means coacting with said last named means and associated cutters to accurately present the blank thereto, said aligning means including a straight edge, offset rollers, and common means for driving said rollers.

8. In a machine of the character described the combination of a table; means for feeding a blank over said table; cutters for operating upon opposite sides of the blank; and means including a rotatable shaft for each cutter, a housing for each shaft, a bridge on said table; and means between said bridge and said housing to adjustably mount each cutter.

9. In a machine of the character described the combination of a table; means for feeding a blank over said table; cutters for operating upon opposite sides of the blank; and means including a rotatable shaft for each cutter, a housing therefor, a bridge on said table, and adjustable mountings for each said cutter between said bridge and said housing the adjustable mountings adjustable in two planes, one disposed angularly with respect to the other.

10. In a machine of the character described the combination of a table; means for feeding a blank over said table; cutters for operating upon opposite sides of the blank; and means including a rotatable shaft for each cutter, a housing for each shaft, a bridge on said table, and screw actuated means between said bridge and said housing to mount each cutter for rectilinear adjustment.

11. In a machine for operating upon blanks, a plurality of associated coacting feed tables having feed means for propelling blanks thereover, the feed tables disposed one angularly with respect to the other, each feed table having operatively associated therewith work accomplishing means operative to perform work on the blanks as they are propelled thereby; the blanks after being operated on, on one feed table, discharged to the receiving end of a succeeding feed table; the receiving end of the succeeding feed table disposed in a substantially horizontal plane slightly depressed vertically relative to the discharge end of a preceding feed table, there being provided at the discharge end of a preceding feed table a discharge means, the discharge means maintaining a blank in substantially horizontal position in the plane of the preceding feed table until the blank is substantially fully discharged therefrom, the propelling means of the succeeding feed table then receiving the blank and carrying it by the associated work accomplishing means to be operated upon.

12. The structure defined in claim 11, wherein the discharge means from a feed table comprises discharge rolls.

13. In the structure defined in claim 11, drive means for driving the discharge means and drive means for driving the propelling means of the succeeding feed table and wherein the said several drive means operate said discharge means and propelling means at linear speeds respectively in direct proportion to the length of the blank measured in the direction of the movement thereof on the respective feed tables.

TREADWAY B. MUNROE.